United States Patent [19]
Wickersheimer

[11] 3,735,167
[45] May 22, 1973

[54] SPEED SENSOR FOR MECHANICAL ADJUSTABLE SPEED DRIVE

[75] Inventor: Jack C. Wickersheimer, West Allis, Wis.

[73] Assignee: The Louis Allis Company, Milwaukee, Wis.

[22] Filed: Dec. 7, 1971

[21] Appl. No.: 205,573

[52] U.S. Cl. ............................310/168, 74/230.17 A
[51] Int. Cl. .............................................H02k 19/24
[58] Field of Search.......................310/168, 68, 169, 310/66, 170; 74/230.17 A, 230.17 B

[56] References Cited

UNITED STATES PATENTS

| | | | |
|---|---|---|---|
| 3,458,741 | 7/1969 | Woodward | 310/168 |
| 2,287,326 | 6/1942 | Reeves | 74/230.17 B |
| 3,132,337 | 5/1964 | Martin | 310/170 |
| 3,541,369 | 11/1970 | Murakami | 310/168 |
| 2,224,369 | 12/1940 | Reeves | 74/230.17 A |
| 2,277,004 | 11/1940 | Reeves | 74/230.17 A |

*Primary Examiner*—R. Skudy
*Attorney*—Alan C. Rose, Harold E. Gillman and Alfred D. Levine

[57] ABSTRACT

An adjustable ratio transmission mechanism having a variable speed ratio between an input shaft and an output shaft where the speed ratio is varied by changing the effective diameters of a pulley on one shaft having oppositely disposed, coned halves, one fixed and one selectively axially movable along the shaft, and a second pulley on the other shaft having oppositely disposed, coned halves, one fixed on the shaft and one movable axially along the shaft, the movable half being spring biased against the fixed half, the two pulleys being coupled by a belt. Adjusting selectively movable half of one pulley with respect to its fixed half produces the opposite movement of the movable half of the other pulley biased by the spring. The improvement comprising a single cup-like member to both retain the pulley biasing spring and position and provide a means to sensing shaft speed. The cup-like member is perforated to periodically vary the reluctance of the magnetic circuit of a magnetic pickup as the shaft rotates, thereby providing a signal indicative of the speed of the shaft.

5 Claims, 1 Drawing Figure

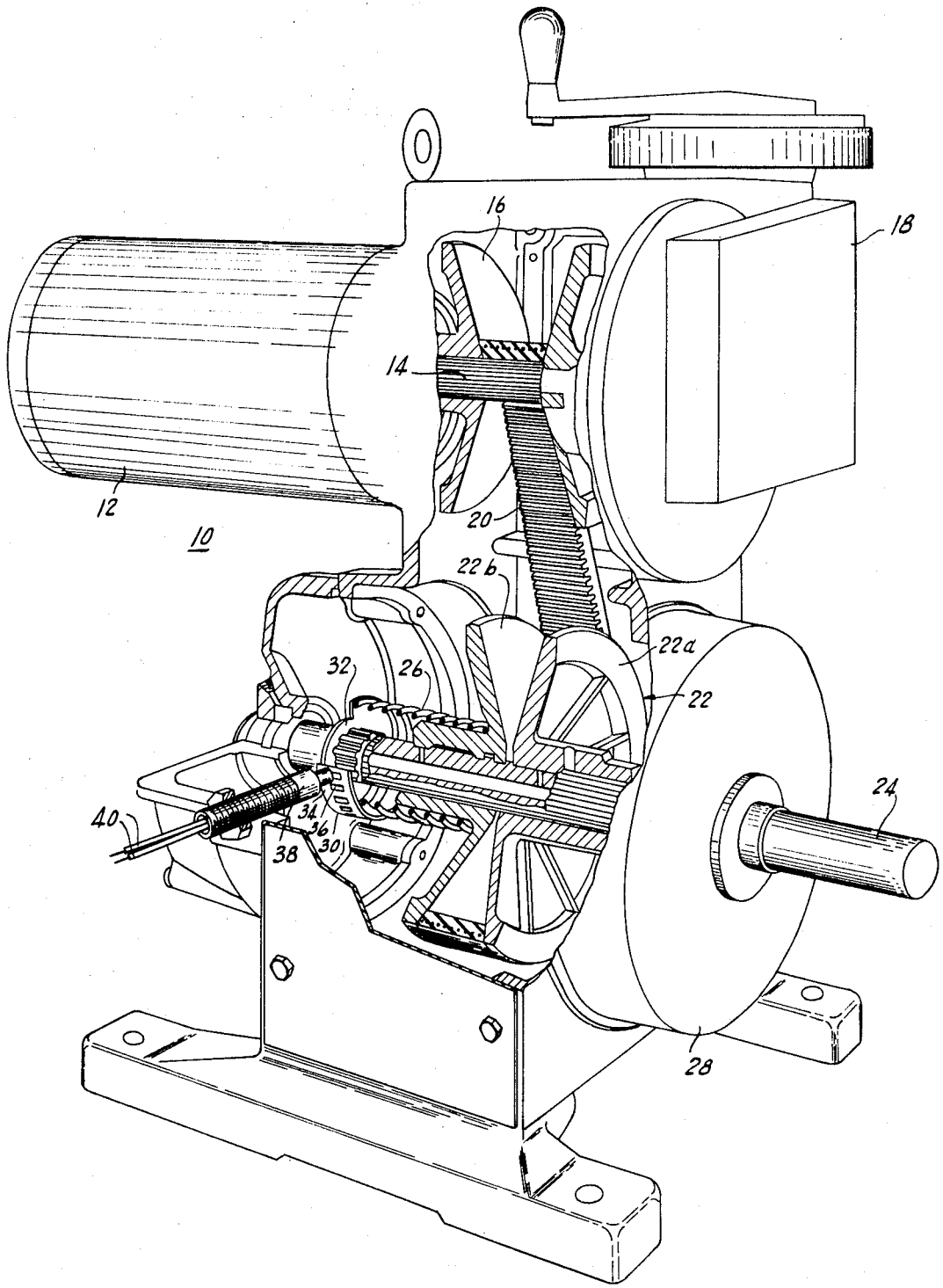

SPEED SENSOR FOR MECHANICAL ADJUSTABLE SPEED DRIVE

BACKGROUND OF THE INVENTION

1. Field of the Invention

The present invention relates to a structure suitable for use in a variable ratio transmission mechanism.

2. Description of the Prior Art

In adjustable ratio transmission mechanism the variation in the speed ratio between the input and output shafts is obtained by varying the effective diameters of pulleys on the input and output shafts. The pulleys are coupled by a belt drive. The pulleys are each provided with oppositely disposed, coned halves and in each pulley one of these halves is axially movable along the shaft. Means are provided for adjusting the movable half of one of the pulleys, for example, the pulley on the input shaft, relative to its axially fixed, cooperating half, and as this half is moved toward or away from the other half, an opposite movement is affected of the movable pulley half on the output shaft by the belt. The movable pulley half on the output shaft is spring biased to effect this operation. As a result of the effective diameters of the pulleys being changed in opposite directions, the speed ratio between the input and output shafts may be varied.

SUMMARY OF THE PRESENT INVENTION

It is the object of the present invention to provide an improved means for both retaining the moving pulley biasing spring on the output shaft and providing a means of sensing the speed of the output shaft.

To this end, a cup-like member is mounted on the shaft to receive and retain the spring in the compressive state. The cup-like member is constructed to provide a periodically variable reluctance as the shaft rotates. A magnetic pick up head is responsive to these variations in reluctance to provide a speed responsive output signal.

BRIEF DESCRIPTION OF THE DRAWING

The FIGURE is a perspective view showing the magnetic speed sensor of the present invention.

DESCRIPTION OF THE PREFERRED EMBODIMENT

FIG. 1 shows variable diameter pulley adjustable speed drive 10 in which the present invention may be incorporated. The drive contains electric motor 12 for driving input shaft 14. Input shaft 14 contains adjustable pulley 16 the diameter of which can be varied by moving a movable half of the pulley toward or away from a fixed pulley half by speed changing mechanism 18.

Belt 20 couples adjustable pulley 16 to adjustable pulley 22, one half 22a of which is fixed and the other half 22b of which is movable along splined output shaft 24 as the diameter of pulley 16 is varied. A spring 26 urges half 22b against half 22a so that the coupling of the pulleys by belt 20 is maintained. Output shaft 24 is journalled in housing 28.

Cup-like retaining member 30 is mounted on shaft 24 to receive the end of spring 26 which does not coact with pulley 22. Member 30 includes a radially extending wall 32 on which is mounted a tubular flange 34. Tubular flange 34 contains circumferentially spaced equally sized perforations 36. The number of such perforations in flange 34 is selected in accordance with the sensitivity and sensing accuracy desired of the speed sensor. The size of the portions of tubular flange 34 between the perforations are also equally sized, but the size of these portions and perforations 36 need not be the same. Cup-like member 30 may be formed of a ferrous metal or other appropriate material.

A magnetic pick up 38 is mounted in housing 28 so that the sensing portions thereof are in proximity to flange 34.

As output shaft 24 rotates, the perforations in flange 34 periodically vary the reluctance of the magnetic circuit of magnetic pick up 38 providing a signal in conductors 40 which is proportional to the speed of shaft 24.

Cup-like member 32 thus provides the dual functions of both retaining spring 26 in abutment with pulley half 22b and providing a means of sensing the speed of shaft 24.

Various modes of carrying out the invention are contemplated as being within the scope of the following claims particularly pointing out and distinctly claiming the subject matter which is regarded as the invention.

I claim:

1. A shaft speed sensing device for an adjustable speed drive of the type in which a shaft is surrounded by a compressive spring for biasing an expansible adjustable diameter pulley, said shaft being journalled in a housing and said speed sensing device comprising:
   a cup-like member mounted on said shaft for receiving said compressive spring, said member having a portion thereof having a periodically variable reluctance as said shaft rotates; and
   a pick up means mounted in said housing adjacent said member and responsive to the variations in the reluctance in said member for providing a signal corresponding to the speed of said output shaft.

2. The speed sensing device of claim 1 wherein said cup-like member has a peripheral flange having circumferentially spaced portions of differing reluctance.

3. The speed sensing device of claim 2 wherein said flange is metal and has circumferentially spaced portions thereof removed to provide a periodically variable reluctance as the shaft rotates.

4. The speed sensing means according to claim 2 wherein said peripheral flange is tubular having an axis which is coaxial with said shaft.

5. The shaft speed sensing device as defined in claim 3 wherein the flange of said cup-like member is provided with a series of apertures, and wherein said pickup means is mounted immediately adjacent said apertured flange.

* * * * *